United States Patent [19]

Duran

[11] Patent Number: 5,007,762

[45] Date of Patent: Apr. 16, 1991

[54] RELEASABLE LOCKING MECHANISM

[75] Inventor: John A. Duran, Glendora, Calif.

[73] Assignee: Avibank Mfg., Inc., Burbank, Calif.

[21] Appl. No.: 463,381

[22] Filed: Jan. 9, 1990

[51] Int. Cl.$^5$ .............................................. F16D 1/10
[52] U.S. Cl. .................................. 403/341; 403/171; 403/176; 403/340
[58] Field of Search ............... 403/341, 171, 176, 170, 403/331, 322, 328, 340, 339, 100

[56] References Cited

U.S. PATENT DOCUMENTS

| | | | |
|---|---|---|---|
| 1,180,166 | 4/1916 | McDonogh | 403/340 |
| 2,548,089 | 4/1951 | Wycosky | 403/341 X |
| 2,863,685 | 12/1958 | Boyce | 403/341 X |
| 3,220,757 | 11/1965 | Potter | 403/340 |
| 4,679,961 | 7/1987 | Stewart | 403/341 |
| 4,822,199 | 4/1989 | Nehls | 403/171 |

Primary Examiner—Peter M. Cuomo
Attorney, Agent, or Firm—Poms, Smith, Lande & Rose

[57] ABSTRACT

A releasable locking mechanism comprising a pair of interconnecting members. One of the members has a cavity for receiving therein a terminal end on the other member generally configured to the cavity. The terminal end is laterally placed in the cavity and a spring biased plunger in the member having the terminal end engages the exterior wall of the cavity and moves backwardly allowing a locking sleeve on the member having the terminal end to be slid to a position surrounding the engaged terminal end in the cavity and locking the same. A frictional-held release sleeve is also provided on the member having the terminal end rearward of the locking sleeve which may be slid forwardly to release the locking sleeve from locking engagement.

31 Claims, 7 Drawing Sheets

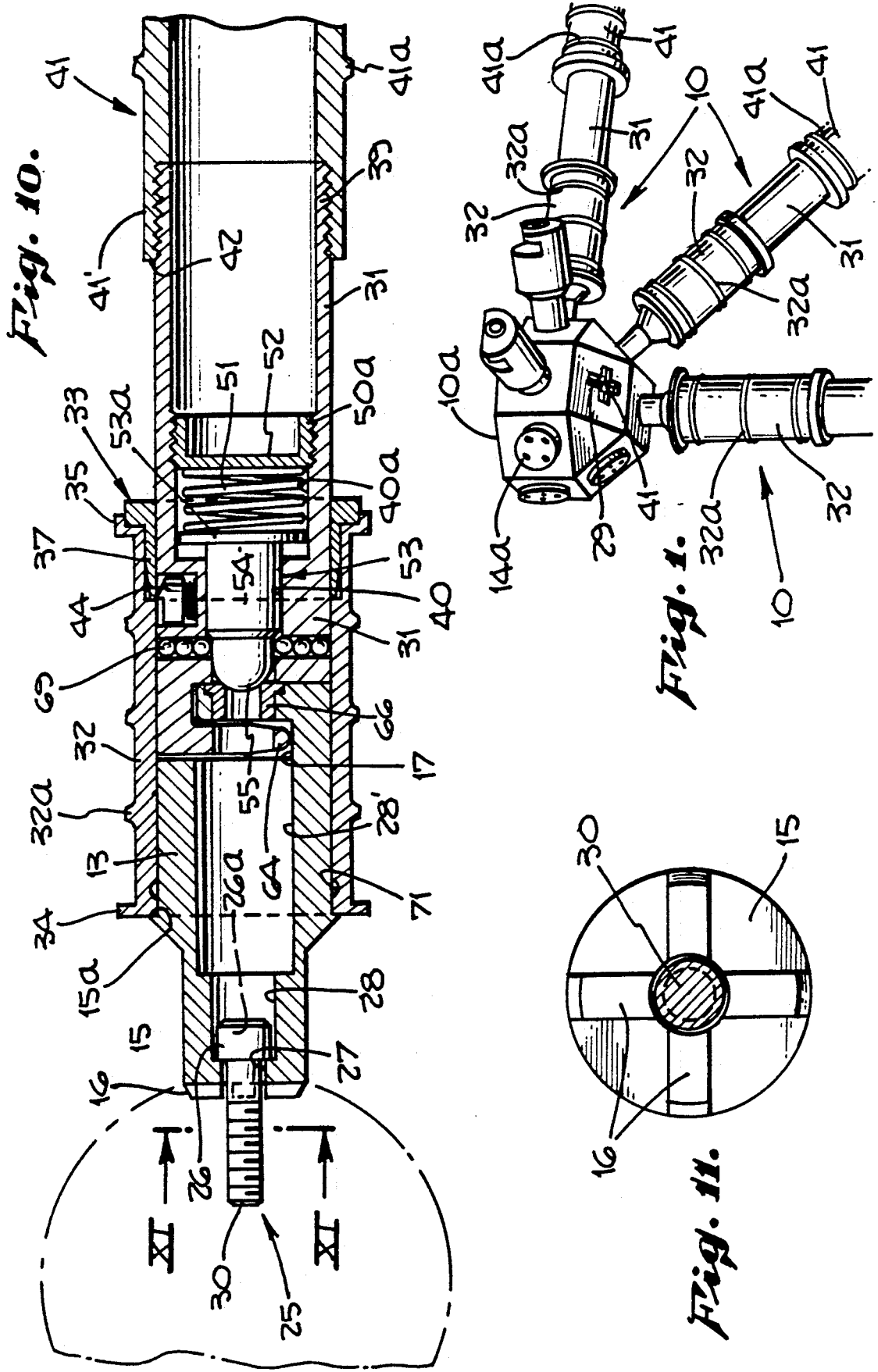

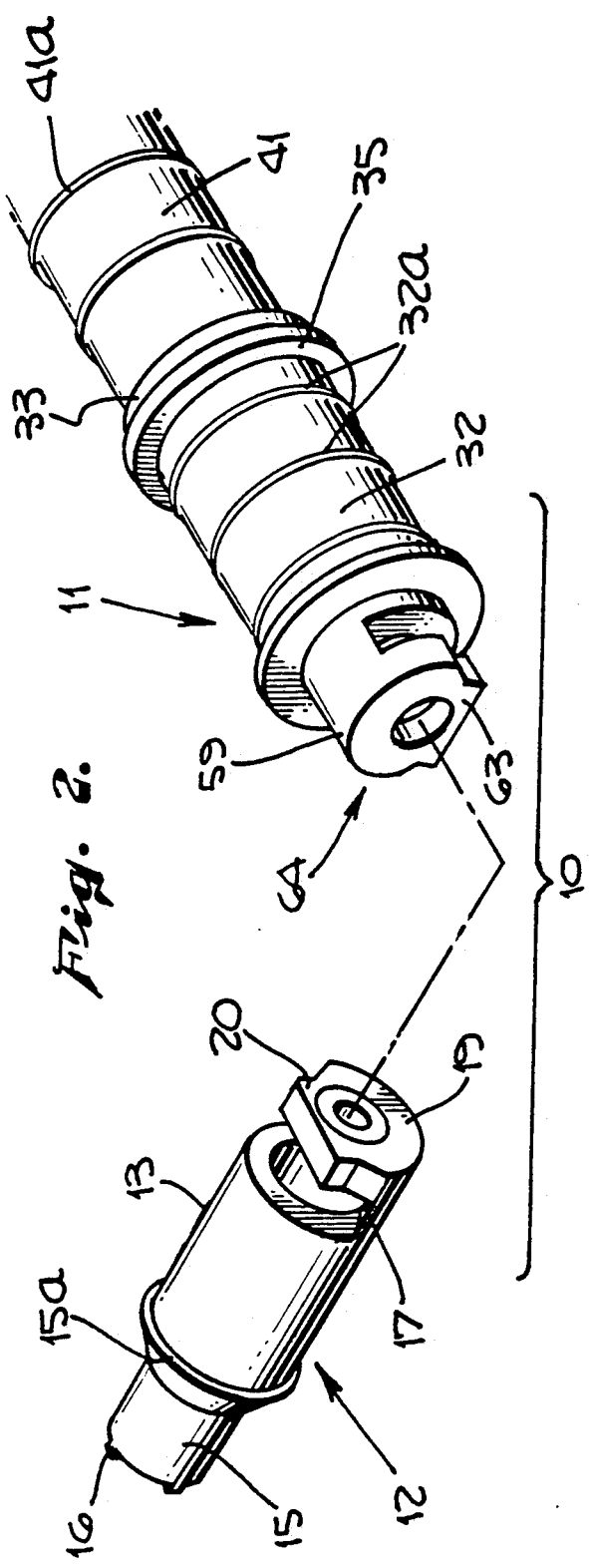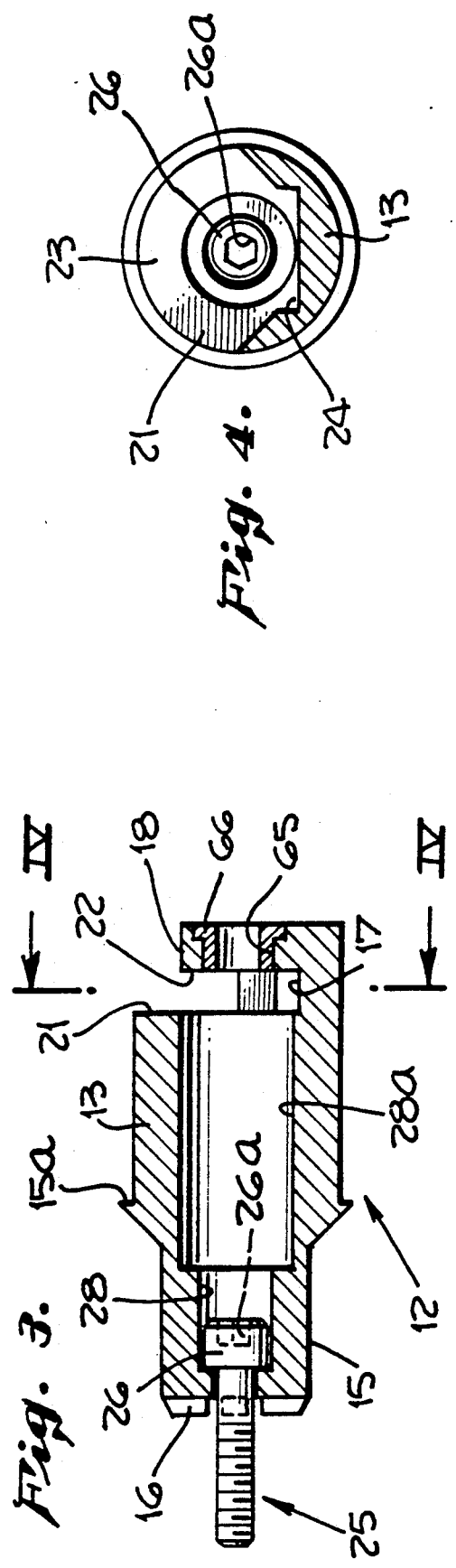

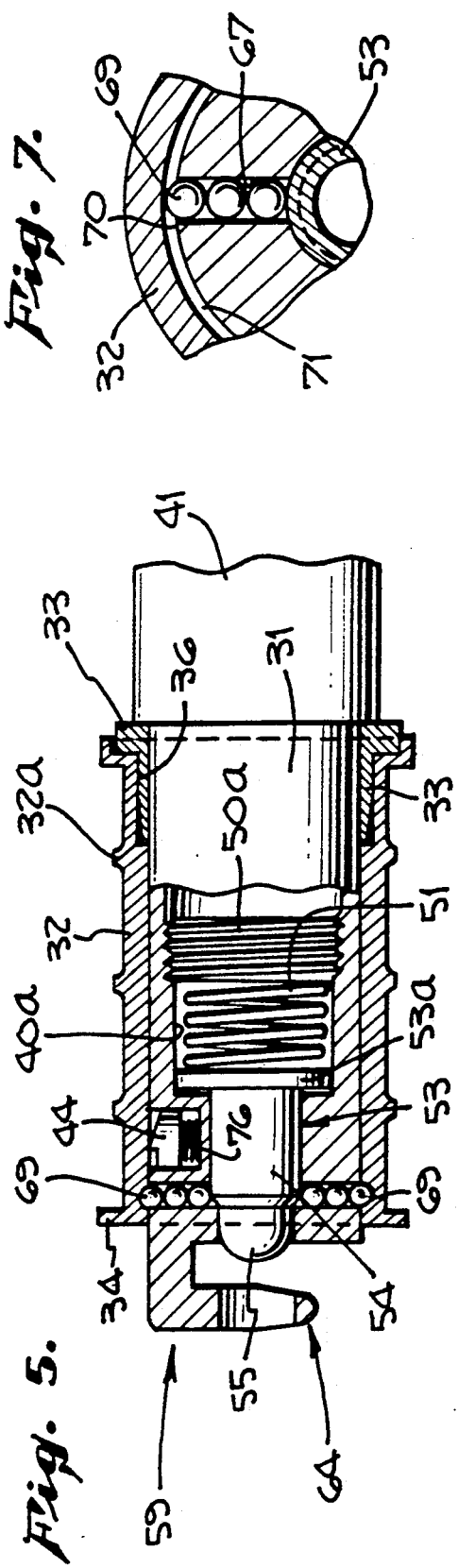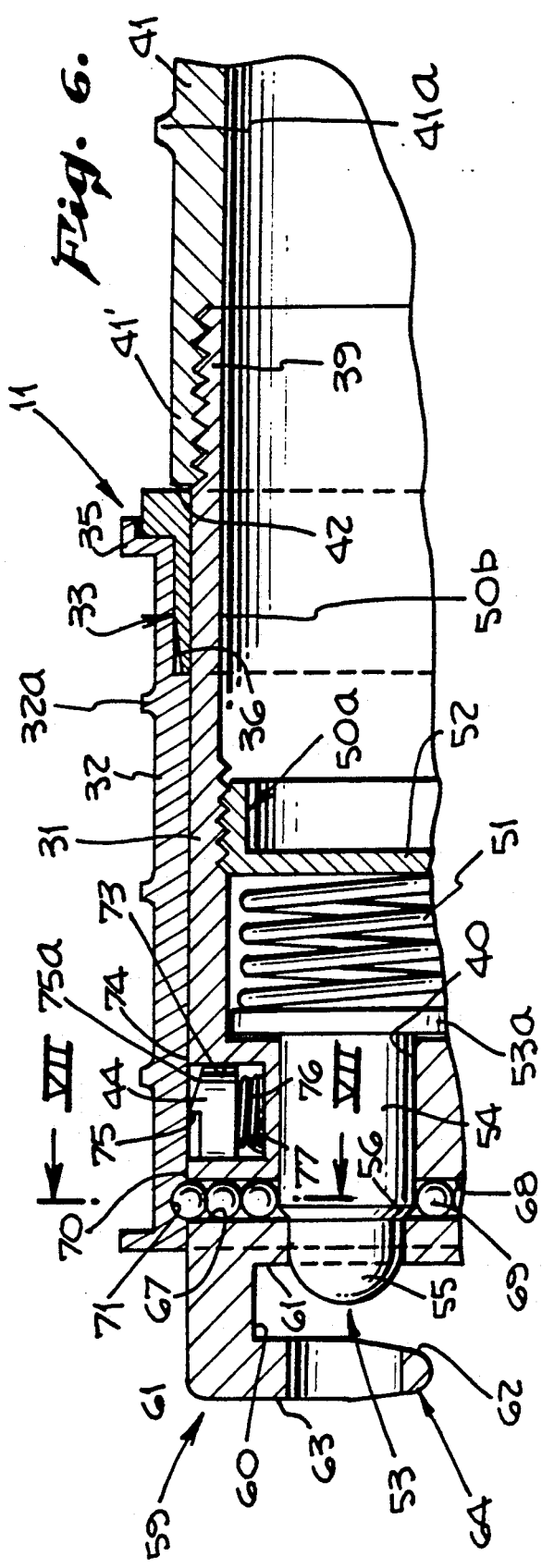

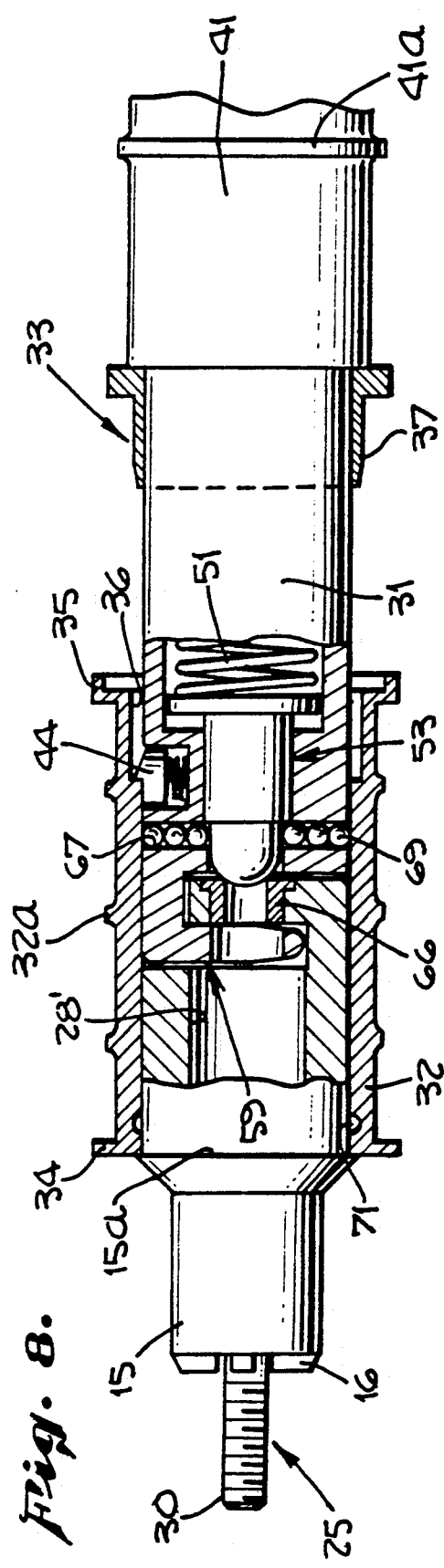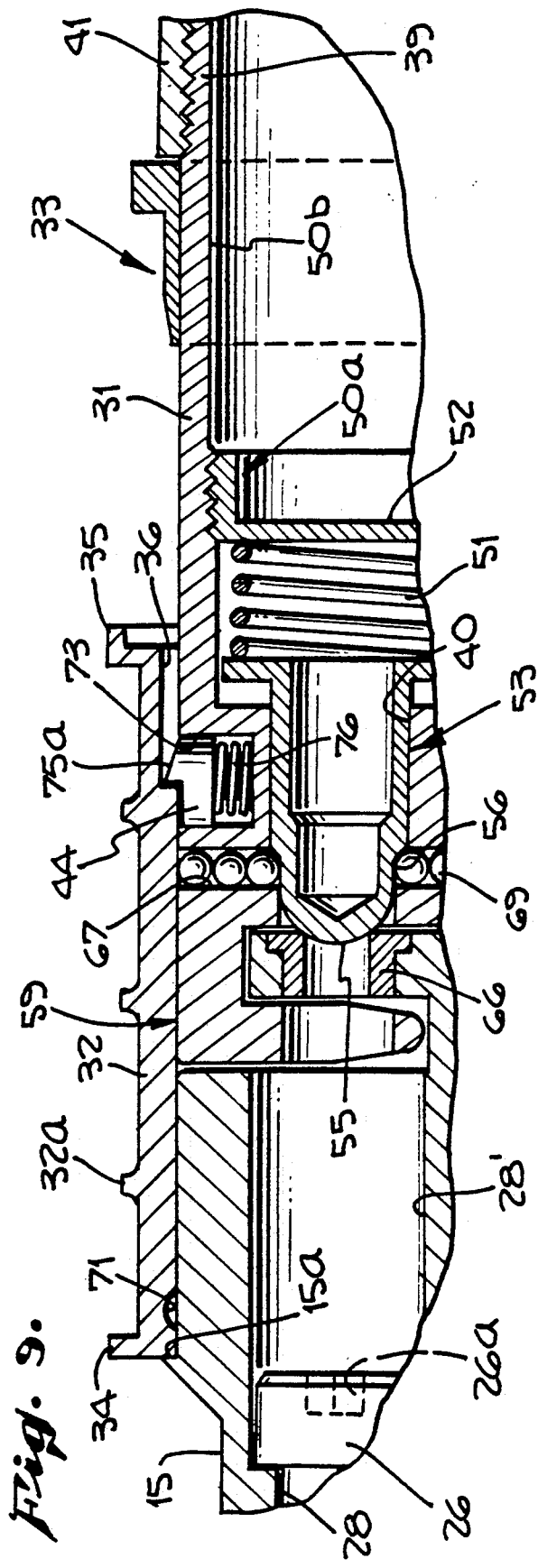

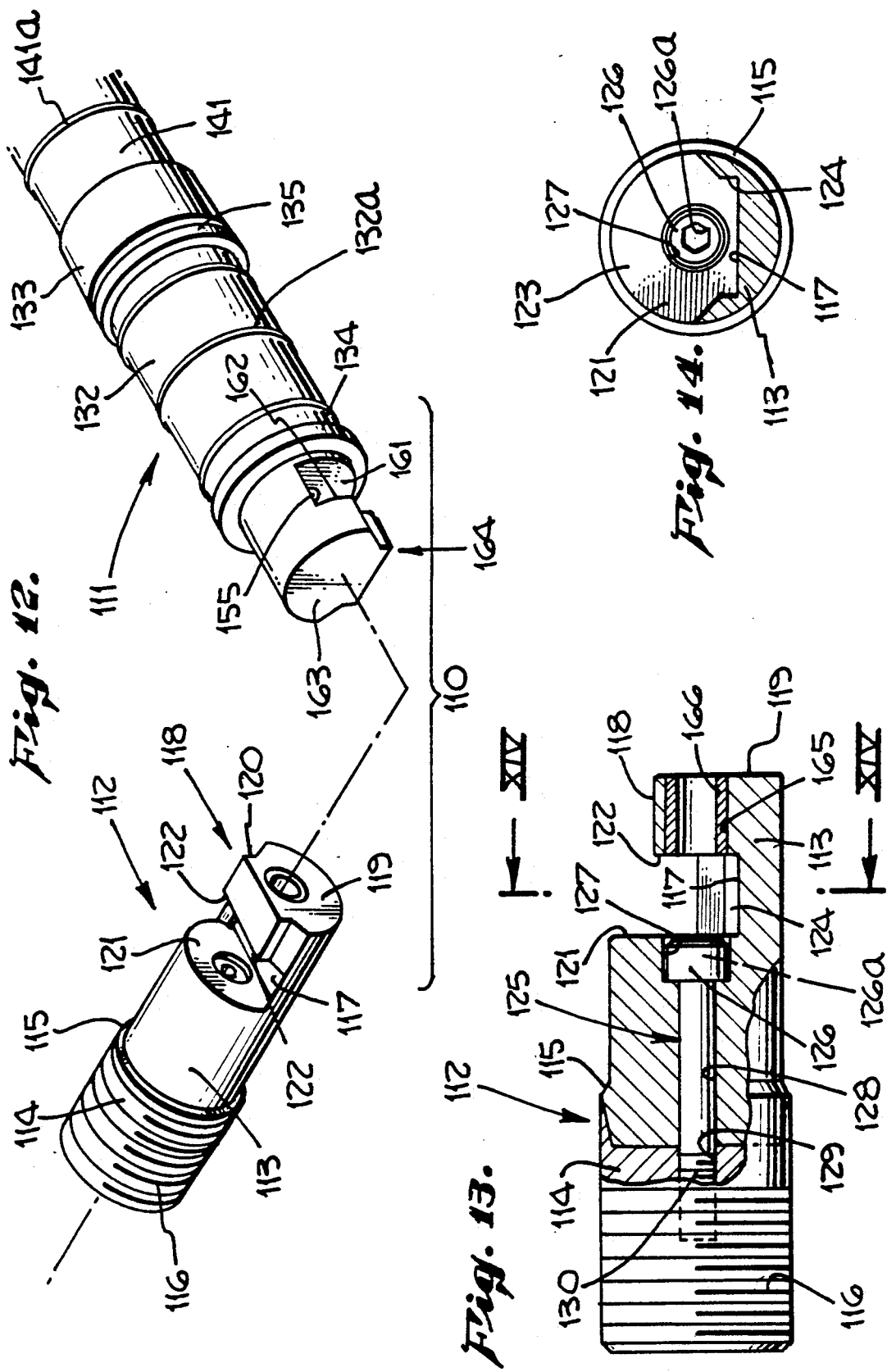

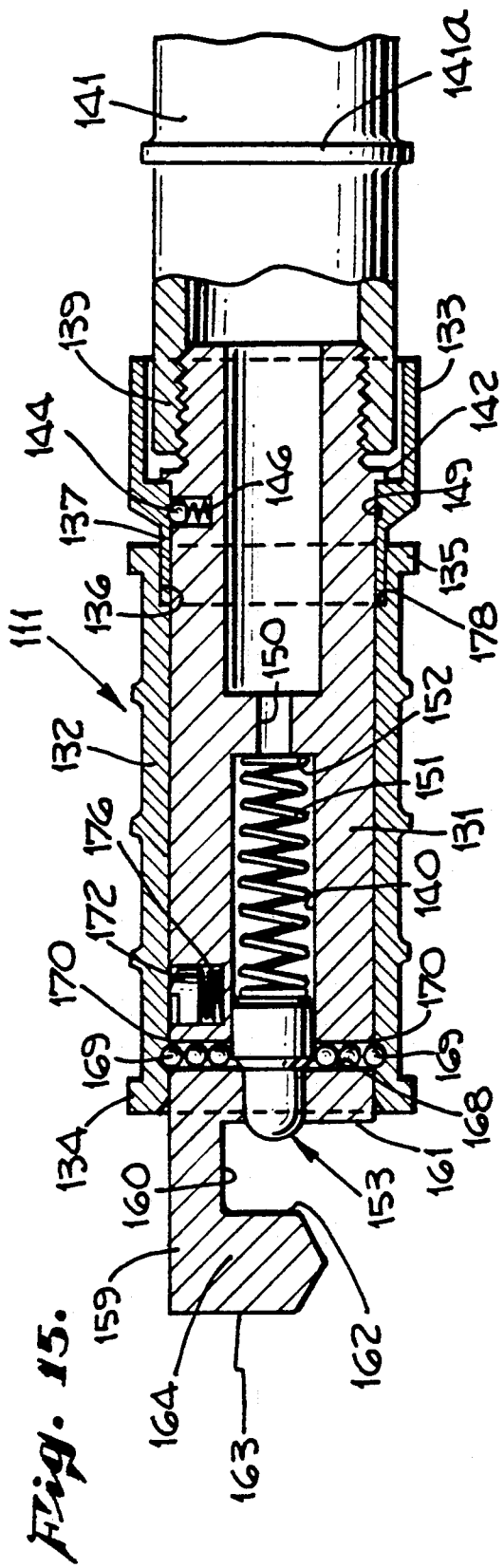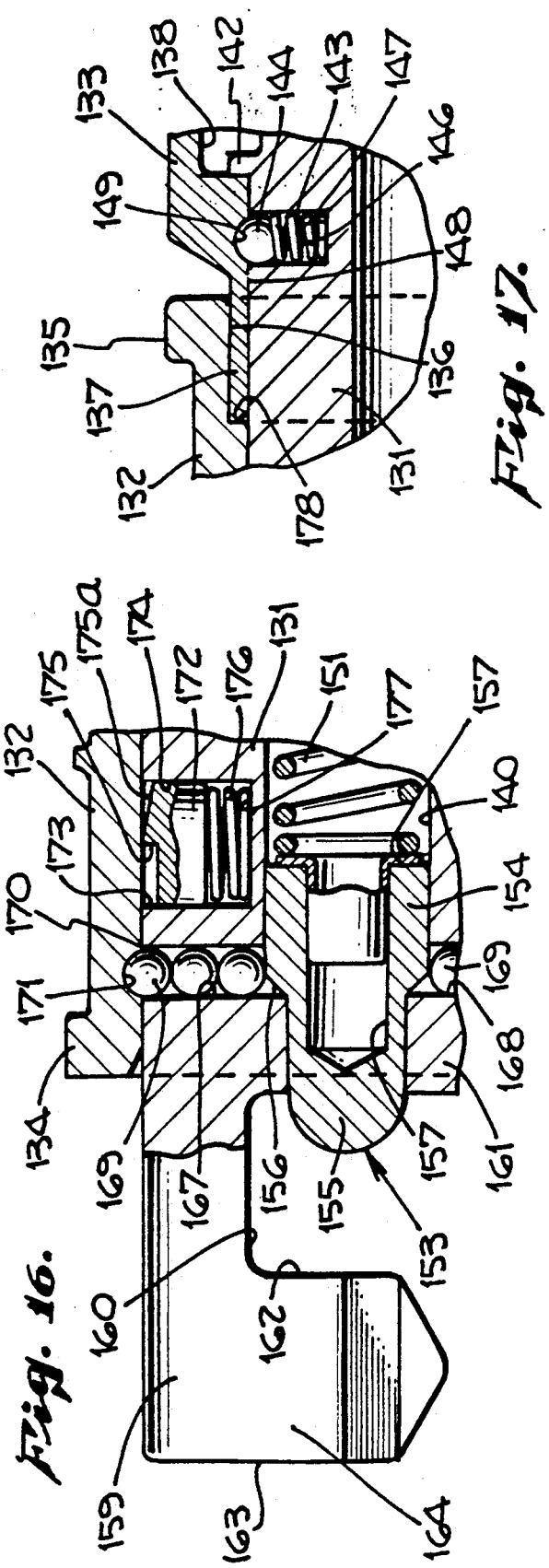
Fig. 15. Fig. 16. Fig. 17.

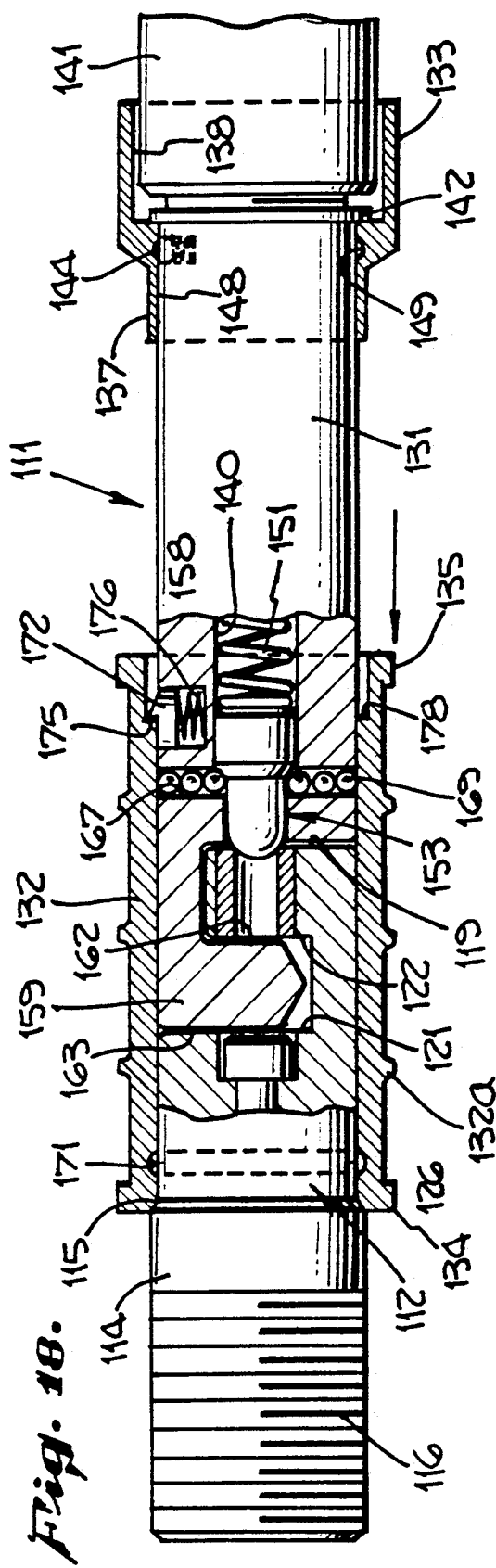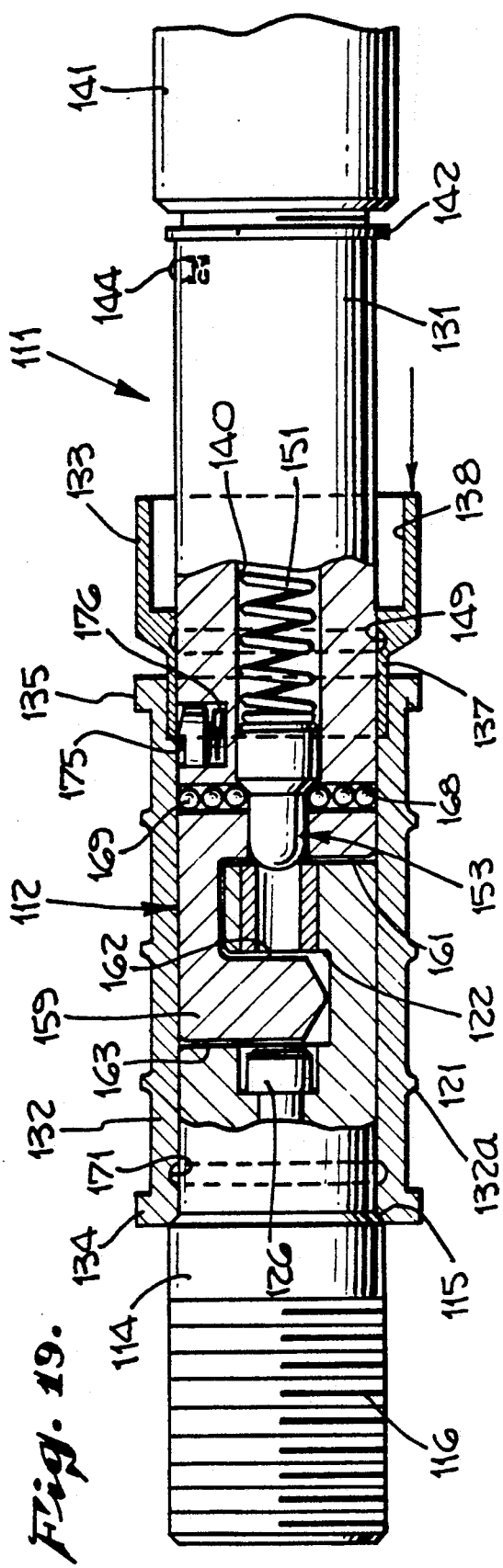

5,007,762

1

RELEASABLE LOCKING MECHANISM

BACKGROUND OF THE INVENTION

1. Field of the Invention

The invention relates to quick release locking mechanisms; and, more particularly, to a locking mechanism for connecting two members in a positive manner yet allowing quick release.

2. Description of the Prior Art

In recent years, the use of robotics has successfully reduced the time and labor necessary to connect up one member to another. In some operations, such a connecting mechanism must be able to quickly connect up the two members, positively lock the same, yet allow quick release with slight release force or pressure. In still other operations, it may be necessary to lock up two members with an action that may be difficult to carry out by robotic means.

There thus exists a need for a quick release locking mechanism for connecting one member to another wherein the members are positively locked together, yet may be quickly released with little force or pressure.

SUMMARY OF THE INVENTION

It is an object of this invention to provide a quick release mechanism for connecting one member to another wherein the members are positively locked together, yet may be quickly released with little force or pressure.

It is a further object of this invention to provide a quick release mechanism as in the foregoing object which can be locked in a first soft locked position, then positively locked in a hard lock position and quickly released with a sliding action.

It is still further an object of this invention to carry out the foregoing objects wherein the members can be quickly aligned for proper locking.

These and other objects are preferably accomplished by providing a releasable locking mechanism comprising a pair of interconnecting members. One of the members has a cavity for receiving therein a terminal end on the other member generally configured to the cavity. The terminal end is laterally placed in the cavity and a spring biased plunger in the member having the terminal end engages the exterior wall of the cavity and moves backwardly allowing a locking sleeve on the member having the terminal end to be slid to a position surrounding the engaged terminal end in the cavity and locking the same. A frictional-held release sleeve is also provided on the member having the terminal end rearward of the locking sleeve which may be slid forwardly to release the locking sleeve from locking engagement.

BRIEF DESCRIPTION OF THE DRAWING

FIG. 1 is a perspective view of a station having a plurality of locking members in accordance with the invention;

FIG. 2 is a perspective view of a preferred embodiment of the locking mechanism alone of the invention;

FIG. 3 is a vertical cross-sectional view of one of the connecting members alone of the locking mechanism of FIG. 2;

FIG. 4 is a view taken along lines IV—IV of FIG. 3;

FIG. 5 is a vertical cross-sectional view of the other connecting member alone of the embodiment of FIG. 2;

2

FIG. 6 is an enlarged sectional view of the member of FIG. 5;

FIG. 7 is a view taken along lines VII—VII of FIG. 6;

FIG. 8 is a vertical view, partly in section, showing the two locking members joined together illustrating a first position thereof;

FIG. 9 is an enlarged sectional view of a portion of the members of FIG. 8;

FIG. 10 is a vertical cross-sectional view similar to FIG. 8 showing the locking member coupled to station 10a of FIG. 1;

FIG. 11 is a view taken along lines XI—XI of FIG. 10;

FIG. 12 is a perspective view of a modified locking mechanism of the invention;

FIG. 13 is a vertical cross-sectional view of one of the connecting members alone of the locking mechanism of FIG. 12;

FIG. 14 is a view taken along lines XIV—XIV of FIG. 13;

FIG. 15 is a vertical cross-sectional view of the other connecting member alone of the locking mechanism of FIG. 12;

FIGS. 16 and 17 are enlarged fragmentary views of the embodiment of FIG. 15; and FIGS. 18 and 19 are sequential cross-sectional views illustrating the operation of the mechanism of FIGS. 12 to 17.

DESCRIPTION OF THE PREFERRED EMBODIMENT

Referring now to FIG. 1 of the drawing, a plurality of locking mechanisms 10 are shown coupled to a station 10a. One such connector 10 is shown in exploded view in FIG. 2. Station 10a (FIG. 1) has a plurality of caps 14a closing off cross-shaped cavities 14 (see FIG. 1 where one of the caps 14a has been removed). Referring to FIG. 2 of the drawing, locking mechanism 10 is shown having a first connecting member 11 and a second connecting member 12. Member 12 has an elongated main body portion 13 which may be cylindrical, having a cross-shaped end 16 (see also FIG. 11). Connecting member 12 may thus be quickly and easily inserted into cavity 14 on any suitable structure, such as on station 10a (FIG. 1) with bolt 25 threaded into threaded hole 29 (FIG. 1) as will be discussed. The cross-shaped end 16 when disposed in like configured cavity 14, prevents rotation of member 12.

As seen in FIG. 3, body portion 13 has a locking cavity 17 at its forward end terminating at the front in end 18. The outer diameter of end 18 is slightly less than the outer diameter of body portion 13. Also, as seen in FIG. 2, the cross-section of end 18 is such that a generally circular portion 19 is formed on the lower end and a reduced squared-off portion 20 is formed at the upper end integral with portion 19. Also, main body portion 13 has a reduced diameter end 15 (FIG. 2) with tapered portion 15a leading thereto.

As seen in FIG. 3, cavity 17 is defined at one end by forward facing wall 21 of body portion 13, and at the opposite end by rear facing wall 22. Wall 21, as seen in FIG. 4, has an upper generally circular portion 23 and an integral bottom reduced squared-off portion 24. As seen in FIG. 10, a threaded bolt 25 has an enlarged knurled head 26 with a hex socket 26a at one end receivable in a hole 27 in the end 16. An elongated passageway 28, greater in diameter than the diameter of hole 27, extends through end 15 and is aligned with a larger diameter hole 28' in body portion 13. Bolt 25 has an integral threaded shank 30 threadably receivable in a threaded hole 29 in cavity 14 (FIG. 1). As seen in FIG. 1, a plurality of such connecting members 12 are shown threaded into cavities 14 after removal of caps 14a. In this manner, second connecting member 12 is releasably coupled to cavity 14 in station 10a.

First connecting member 11, as seen in FIG. 2, has an elongated, preferably generally cylindrical, main body portion 31 (FIG. 10) with an outer like conforming locking sleeve 32 (FIG. 10) and a rear quick release sleeve 33. Sleeve 32 is thus also preferably generally cylindrical terminating at front and rear flanges 34 and 35, respectively. At the rear end of sleeve 32, an undercut section 36 is provided on the inner wall of sleeve 32 receiving therein a generally cylindrical thin-walled extension portion 37 of sleeve 33. The rear end 39 of main body portion 31 is threaded on the exterior thereof for receiving an internally threaded end 41' of a second elongated connector 41 (see also FIG. 1). Locking sleeve 33 is frictionally secured in position on body portion 31.

A throughbore 40a is provided in main body portion 31 having an elongated coiled spring 51 disposed therein. Spring 51 abuts at its rearward end against an abutment member 52 (FIG. 9) (which may be an interior shoulder or solid flange portion of a threaded insert 50a threaded into a throughbore 50b) and, at the forward end, abuts against a flange 53a integral with a spring loaded plunger 53. Plunger 53 includes a main body portion 54, which may be generally cylindrical and conforming to the interior configuration of throughbore 40, terminating at the forward end is a snub-nosed portion 55. A tapered portion 56 leads from snub-nosed portion 55 to cylindrical portion 54.

The forward end of main body portion 31 terminates in a latch portion 59 adapted to be coupled to connecting member 12 and generally conforming to cavity 17 therein as defined by walls 21,22. Thus, latch portion 59 includes a like cavity 60 (FIG. 6) defined by the wall 61 (out of which the snub-nosed portion 55 of plunger 53 extends) and the wall 62. Wall 62 is spaced from forward facing wall 63 on the terminal end 64 (defined by walls 62, 63) of latch portion 59. As seen in FIG. 2, wall 63 is configured similarly to wall 21 whereas wall 62 is similarly configured to wall 22. The width or thickness of end 64 is related to the width of cavity 17. As seen in FIG. 3, and as will be discussed further, when end 64 is disposed in cavity 17, the mating parts conform to each other so that the outer surfaces of end 64 and the mating main body portion 13 are flush as shown.

The terminal end of body portion 13 defined by spaced walls 22 and 19 has a throughbore 65 (FIG. 3) receiving therein a reinforcing sleeve 66 for bearing the resulting wear on member 12. The inner diameter of sleeve 66 is related to the outer diameter of snub-nosed portion 55 which is receivable therein, as will be discussed. Bolt 25 is installed in body portion 13 before sleeve 66 is inserted or installed in throughbore 65. Sleeve 66 thus traps bolt 25 in place and provides a hard surface for portion 55 as will be discussed.

Referring again to FIG. 6, a pair of passageways 67, 68 extend through the forward end of main body portion 31 from the outside to the inside thereof. Passageways 67, 68 may be coaxially aligned and receive therein one or more detents, such as three balls 69 in each passageway 67, 68, the exterior of each passageway 67, 68 being peened at peening 70 to prevent release of balls 69. An annular cavity or groove 71 is provided on the inner wall of the forward portion of sleeve 32 rearward of flange 34 for receiving balls 69 therein when sleeve 32 is in the FIG. 6 position, as will be discussed.

A locking pawl 44 is disposed in a cavity or hole 73 in main body portion 31 rearward of passageway 67. Reference may be had to my U.S. Pat. No. 4,759,671 for similar structure. Pawl 44 is thus retained in hole 73 by peening 74 and has a forward facing wall portion 75 and slanting rear portion 75a for reasons heretofore discussed. A spring 76 is disposed in hole 73 between pawl 44 and the bottom wall 77 of hole 73 to normally bias pawl 44 outwardly.

It can be seen in FIG. 2 that first connecting member 11 can be pulled in a direction parallel to its longitudinal axis toward second connecting member 12, then moved laterally to dispose terminal end 64 into cavity 17 as seen in FIG. 10. However, it can be seen in comparing FIGS. 6 and 9 that sleeve 32 in FIG. 6 cannot be moved into the FIG. 9 position since balls 69 in groove 71 retain sleeve 32 in the FIG. 6 position. Thus, the operator can easily grasp sleeve 32 and move first connecting member 11 toward second connecting member 12 and place end 64 laterally into cavity 17 with sleeve 32 still in the FIG. 6 position. The outer diameter of sleeve 32 can be appreciably large, such as two inches, and first and second connecting members can easily be handled by operators wearing clumsy gloves or the like and easily connected up.

When end 64 is placed in cavity 17, which is a non-positive or "soft" lock of the two members 11, 12 since sleeve 32 is still in the FIG. 6 position, the snub-nosed portion 55 of plunger 53 engages the exterior of sleeve 66. The plunger 53 is thus pushed back in a direction away from member 12 (the position shown in FIGS. 8-10). This allows balls 69 to move over tapered portion 56 and thus to engage the reduced outer diameter of snub-nosed portion 55 as seen in FIGS. 8-10. However, due to the spring bias of pawl 44 against the inner wall of sleeve 32, the sleeve 32 remains in the FIG. 5 position even though balls 69 are no longer disposed in groove 71. Thus, a second or positive lock step is necessary to effect locking of the two members 11, 12. The sleeve 32 is grasped and moved from the FIG. 5 position to the FIG. 8 position until flange 34 abuts against flange 15a as seen in FIG. 10. Pawl 44 springs up and forward portion 75 engages shoulder 78 (FIG. 9) on the inner wall of sleeve 32 adjacent flange 35. The two members 11, 12 are now positively locked together and the locking mechanism 10 cannot become unconnected.

If it is desired to release the two locking members 11, 12, the operator grasps release sleeve 33 and moves it against its frictional engagement with sleeve 41 from the FIG. 8 position toward member 12 (i.e., to the FIG. 10 position). The extension portion 37 of sleeve 33 engages the upper tapered surface 75a of pawl 44 (FIG. 9) pushing it inwardly against the bias of spring 76 to the FIG. 10 position. Sleeve 32 can now be slid back toward shoulder 42 on connector 41 pushing release sleeve 33 backwardly at the same time until balls 69 snap into the groove 71 (the FIG. 6 position) and release sleeve 33 abuts against shoulder 42.

The configuration of cavity 17 and end 64 provides both an alignment for the mating members and a bottoming out of end 64 into cavity 17. This prevents lateral movement of the mating parts when in the "soft"

lock position prior to positive or handlocking. Of course, the interfacing between cavity 7 and end 64 may vary as long as the interfacing structure provides a lead in for ease of assembly. The locking mechanism 10 is robot friendly and thus, easily adapted to robotics and automation. If desired, as seen in FIG. 1, a plurality of elongated ribs 32a and 41a, respectively, may be provided on members 32 and 41, respectively, to assist in grasping the same.

The outer configuration of members 11, 12 and cross-section, may be of any suitable shape. Connectors 14 and 41 may also be of any suitable shape, extent, arrangement of parts, etc. For example, members 11, 12 and connectors 14 and 41 may be part of a building kit, either toys or actual building structures, such as construction toys. Thus, any suitable materials may be used, such as metals, plastics or the like. Although ball detents have been disclosed, obviously any suitable release mechanism may be used.

Referring now to FIGS. 12 to 19 of the drawing, an alternate embodiment of the invention is shown. In this embodiment, locking mechanism 110 is shown having a first connecting member 111 and a second connecting member 112. Member 112 has an elongated main body portion 113, which may be cylindrical, coupled to a connector 114, an integral flange 115 and external threads 116. Connector 114 may thus be quickly and easily threaded to a like threaded member on any suitable structure.

As seen in FIG. 13, body portion 113 has a locking cavity 117 at its forward end terminating at the front end in terminal end 118 defined by walls 122, 119. The outer diameter of end 118 is slightly less than the outer diameter of body portion 113. Also, as seen in FIG. 12, the cross-section of end 118 is such that a generally circular portion 119 is formed on the lower end and a reduced squared-off portion 120 is formed at the upper end integral with portion 119.

As seen in FIGS. 13 and 14, cavity 117 is defined at one end by forward facing wall 121 of body portion 113, and at the opposite end by rear facing wall 122. Wall 121, as seen in FIG. 14, has an upper generally circular portion 123 and an integral bottom reduced squared-off portion 124. As seen in FIG. 13, a threaded bolt 125 has an enlarged knurled slotted head 126 at one end receivable in a hole 127 in the wall 121 of body portion 113. An elongated passageway 128, lesser in diameter than the diameter of hole 127, extends through body portion 113, and is aligned with a like diameter threaded hole 129 in connector 114. Bolt 125 has an integral threaded shank 130 threaded into hole 129. In this manner, second connecting member 112 is releasably coupled to connector 114.

First connecting member 111 has an elongated, preferably generally cylindrical, main body portion 131 (FIG. 15) with an outer like conforming locking sleeve 132 and a rear quick release sleeve 133. Sleeve 132 is thus also preferably generally cylindrical terminating at front and rear flanges 134, 135, respectively. At the rear end of sleeve 132, an undercut section 136 is provided on the inner wall of sleeve 132 receiving therein a generally cylindrical thin-walled extension portion 137 of sleeve 133. Sleeve 133 also has an undercut section 138 (FIG. 19) on its inner wall rearwardly of extension portion 137 for reasons to be discussed. The rear end 139 of main body portion 131 is threaded on the exterior thereof for receiving an internally threaded end 140 (FIG. 15) of a second connector 141 (see also FIG. 12).

An abutment shoulder 142 is provided on body portion 132 to provide a stop for release sleeve 133.

As is well known in the art, a conventional ball lock mechanism is provided for temporarily locking sleeve 133. Thus, as seen in FIG. 17, a cavity or hole 143 is provided on the outer periphery of body portion 131 receiving therein a ball detent 144. Ball detent 144 is prevented from exiting hole 143 by peening 145 or the like surrounding the outside of hole 143 as is well known in the art. A spring 146 is provided between ball detent 144 and the bottom wall 147 of hole 143 to bias ball detent 144 outwardly as is also well known in the art. A cavity 149 is provided on the inner wall 148 of sleeve 133 between extension portion 137 and undercut portion 138 receiving ball detent 144 therein when sleeve 133 is in the FIG. 15 position.

A throughbore 140 is provided in main body portion 131 having an elongated coiled spring 151 disposed therein. Spring 151 abuts at one end against an abutment member 152 (which may be an interior shoulder or solid portion of sleeve 131 in the throughbore 150) and, at the forward end abuts against a spring-loaded plunger 153. Plunger 153 (FIG. 16) includes a main body portion 154, which may be generally cylindrical and conforming to the interior configuration of throughbore 140, terminating at the forward end is a snub-nosed portion 155. A tapered portion 156 leads from snub-nosed portion 155 to cylindrical portion 154. Plunger 153 terminates in a flange 157. Spring 151 abuts against flange 157.

The forward end of main body portion 131 (FIG. 15) terminates in a latch portion 159 adapted to be coupled to connecting member 112 and generally conforming to cavity 117 therein as defined by walls 121, 122. Thus, latch portion 159 includes a like cavity 160 defined by the wall 161 (out of which the snub-nosed portion 155 of plunger 153 extends) and the wall 162. Wall 162 is spaced from forward facing wall 163 on the terminal end 164 of latch portion 159. As seen in FIG. 12, wall 163 is configured similarly to wall 121 whereas wall 162 is similarly configured to wall 122. The width or thickness of end 164 is related to the width of cavity 117. As seen in FIG. 18, and as will be discussed further, when end 164 is disposed in cavity 117, the mating parts conform to each other so that the outer surfaces of end 164 and the mating main body portion 113 are flush as shown.

The terminal end of body portion 113 defined by spaced walls 122 and 119 has a throughbore 165 (FIG. 13) receiving therein a reinforcing sleeve 166 for bearing the resulting wear on member 112, which sleeve 166 is again installed after bolt 125 is installed. The inner diameter of sleeve 166 is related to the outer diameter of snub-nosed portion 155 which is receivable therein, as will be discussed.

Referring again to FIG. 16, a pair of passageways 167, 168 extend through the forward end of main body portion 131 from the outside to the inside thereof. Passageways 167, 168 may be coaxially aligned and receive therein one or more detents, such as three balls 169 in each passageway 167, 168, the exterior of each passageway 167, 168 being peened at peening 170 to prevent release of balls 169. An annular cavity or groove 171 is provided on the inner wall of the forward portion of sleeve 132 rearward of flange 134 for receiving balls 169 therein when sleeve 132 is in the FIG. 16 position.

A locking pawl 172 is also provided disposed in a cavity or hole 173 (FIG. 16) in main body portion 132 rearward of passageway 167. Reference may be had to my U.S. Pat. No. 4,759,671 for similar structure. Pawl 172 is thus retained in hole 173 by peening 174 and has a forward facing wall portion 175 and a rearwardly slanting portion 175a for reasons to be discussed. A spring 176 is disposed in hole 173 between pawl 172 and the bottom wall 177 of hole 173 to normally bias pawl 172 outwardly.

It can be seen in FIG. 12 that first connecting member 111 can be pulled in a direction parallel to its longitudinal axis toward second connecting member 112, then moved laterally to dispose terminal end 164 into cavity 117 as seen in FIG. 16. However, it can be seen in comparing FIGS. 16 and 18 that sleeve 132 cannot be moved into the FIG. 18 position since balls 169 in groove 171 retain sleeve 132 in the FIG. 16 position. Thus, the operator can easily grasp sleeve 132 and move first connecting member 111 toward second connecting member 112 and place end 164 laterally into cavity 117 with sleeve 132 still in the FIG. 16 position. The outer diameter of sleeve 132 can be appreciably large, such as two inches, and first and second connecting members can easily be handled by operators wearing clumsy gloves or the like and easily connected up.

When end 164 is placed in cavity 117, with sleeve 132 in the FIG. 16 position, which is a non-positive or "soft" lock of the two members 111, 112, the snub-nosed portion 155 of plunger 153 engages the exterior of sleeve 166. The plunger 153 is thus pushed back in a direction away from member 112 (the position shown in FIGS. 18 and 19). This allows balls 169 to move over tapered portion 156 and thus to engage the reduced outer diameter of snub-nosed portion 155 as seen in FIGS. 18 and 19. However, due to the spring bias of pawl 172 against the sleeve 132 as seen in FIG. 15, the sleeve 132 remains in the FIG. 15 position even though balls 169 are no longer disposed in groove 171. Thus, a second or positive lock step is necessary to effect locking of the two members 111, 112. The sleeve 132 is grasped and moved from the FIG. 15 position to the FIG. 18 position until flange 134 abuts against flange 115. Pawl 172 springs up and wall portion 175 engages shoulder 178 (FIG. 18) on the inner wall of sleeve 132 adjacent flange 135. The two members 111, 112 are now positively locked together and the locking mechanism 110 cannot become unconnected.

If it is desired to release the two locking members 111, 112, the operator grasps release sleeve 133 and moves it against its ball-lock retention means 144 (overcoming the friction therein) from the FIG. 18 position toward member 112 (i.e., to the FIG. 19 position). The extention portion 137 of sleeve 133 engages the upper tapered surface 175a of pawl 172 pushing it inwardly against its spring bias to the FIG. 19 position. Sleeve 132 can now be slid back toward shoulder 142 pushing release sleeve 133 backwardly at the same time until ball 144 snaps into groove 149 and balls 169 snap into the groove 171 (the FIG. 15 position).

The configuration of cavity 117 and end 164 provides both an alignment for the mating members and a bottoming out of end 164 into cavity 117. This prevents lateral movement of the mating parts when in the "soft" lock position prior to positive or handlocking. The locking mechanism 110 is robot friendly and thus, easily adapted to robotics and automation. If desired, the outer surfaces of members 111, 112 can be knurled or ribbed as discussed with respect to the embodiments of FIGS. 1 to 11.

The outer configuration of members 111, 112, and cross-section, may be of any suitable shape as discussed with respect to the embodiment of FIG. 1. A plurality of ridges 132a and 141a may be provided on the exterior of sleeve 132 and connector 141, respectively, to assist in gripping the same. Release sleeve 133 is frictionally locked in position in FIG. 18 until release thereof but may, of course, be positively locked. Connectors 114 and 141 may also be of any suitable shape, extent, arrangement of parts, etc.

I claim:

1. A locking mechanism comprising:
   a first connecting member having a cavity with a bottom wall therein for receiving one end of a second connecting member therein;
   a second connecting member having a terminal end receivable in said cavity and generally conforming to the configuration of said cavity, said terminal end having a bottom wall generally conforming to the bottom wall of said cavity so that said terminal end bottoms out in said cavity thereby preventing lateral movement of said first and second connecting members, said second connecting member having a locking sleeve with an inner wall axially slidable thereon normally held in a position away from said terminal end by means of a spring biased detent on said connecting member disposed in a groove on the inner wall of said sleeve, and first releasable locking sleeve means associated with said second connecting member and said locking sleeve for releasing said locking sleeve and allowing the same to be slid to a position overlying said terminal end thereby retaining said terminal end in said cavity when said terminal end is disposed in said cavity.

2. In the locking mechanism of claim 1 including second locking means associated with said second connecting member and said locking sleeve for positively locking said locking sleeve in said position overlying said terminal end.

3. In the locking mechanism of claim 2 including a release sleeve mounted on said second connecting member and movable thereon from a position remote from said locking sleeve to a position engaging said second locking means thereby releasing said second locking means from locking engagement with said locking sleeve.

4. In the locking mechanism of claim 3 wherein said second locking sleeve means further including a shoulder on the inner wall of said locking sleeve remote from the end thereof adjacent said terminal end.

5. In the locking mechanism of claim 3 including release sleeve retention means associated with said second connecting member and said release sleeve for retaining the same in said remote position.

6. In the locking mechanism of claim 5 wherein said release sleeve retention means includes said release sleeve having an inner and outer wall with a groove in said inner wall receiving therein a spring biased detent mounted in said second connecting member.

7. In the locking mechanism of claim 6 including an annular stop at the end of said second connecting member opposite said terminal end, said release sleeve having a shoulder thereon abutting against said stop when in said remote position.

8. In the locking mechanism of claim 6 wherein said locking sleeve has an outer wall and including an undercut section at the end thereof opposite the end adjacent said terminal end providing a shoulder on the inner wall of said locking sleeve, said second locking sleeve means including a spring biased detent disposed in said second connecting member engaging the inner wall of said locking sleeve when said locking sleeve is in a position remote from said terminal end, said undercut section being disposed over said detent when said locking sleeve is in a position overlying said terminal end with said detent engaging said shoulder.

9. In the locking mechanism of claim 1 wherein said first releasable locking sleeve means further including a spring biased plunger movable from a first position normally biasing said detent into said groove to a second position releasing said detent from said groove.

10. In the locking mechanism of claim 9 wherein said first connecting member has a hole therein of an inner diameter slightly less than the outer diameter of said plunger and coaxially aligned with the longitudinal axis of said plunger when said terminal end is disposed in said cavity whereby said plunger enters said hole and is pushed against its spring bias to release said detent.

11. In the locking mechanism of claim 10 wherein the width of said terminal end along the longitudinal axis of said second connecting member is substantially the same as the width of said cavity along the longitudinal axis of said first connecting member.

12. In the locking mechanism of claim 1 wherein said first connecting member has an annular stop thereon against which said locking sleeve abuts when in said overlying position.

13. In the locking mechanism of claim 1 wherein said cavity is open at the top and said bottom wall is generally flat and upwardly and outwardly extending side walls on each side of said bottom wall, said terminal end also being generally flat and conforming to said first mentioned bottom wall with upwardly and outwardly side walls on each side of said last mentioned bottom wall also conforming to said first mentioned side walls.

14. In the locking mechanism of claim 1 including a first connector releasably coupled to the end of said first connecting means opposite said connector releasably coupled to the end of said second connecting means opposite said terminal end.

15. In the locking mechanism of claim 1 wherein the overall height of said terminal end when disposed in said cavity in a direction normal to the longitudinal axis of said second connecting member is substantially the same as the depth of said cavity in a direction normal to the longitudinal axis of said first connecting members so that the mating outer surfaces of said first and second connecting members when said terminal end is disposed in said cavity are substantially flush.

16. A locking mechanism comprising:
a first elongated connecting member having a cavity with a bottom wall therein at one end with a forward wall portion with a hole therein having its longitudinal axis substantially coincident with the longitudinal axis of said first elongated connecting member;
a second elongated connecting member having a terminal end conforming substantially to said cavity, said terminal end having a bottom wall generally conforming to the bottom wall of said cavity so that said terminal end bottoms out in said cavity thereby preventing lateral movement of said first and second connecting member, said elongated connecting member having a locking sleeve slidably mounted for axial movement on the exterior thereof, said locking sleeve having annular flanges at the front and rear ends thereof with a main body portion interconnecting the flanges having an inner and outer wall, a groove in said inner wall adjacent said front flange receiving therein a spring biased detent in said second connecting member, an undercut area in said inner wall adjacent said rear flange, and a release sleeve mounted on said second connecting member having a thin-walled generally cylindrical portion received in said undercut area and a main body portion abutting against said rear flange with an inner and outer wall, said inner wall having a diameter conforming generally to the exterior of said second connecting member.

17. In the locking mechanism of claim 16 wherein said release sleeve is frictionally held in position to the exterior of said second connecting member prior to release thereof.

18. In the locking mechanism of claim 17 wherein said release sleeve is frictionally held in position prior to release thereof.

19. In the locking mechanism of claim 17 wherein said release sleeve has a groove in said last mentioned inner wall receiving therein a spring biased detent mounted in said second connecting member rearwardly of said first mentioned detent, and a spring biased detent mounted in said second connecting member abutting against the inner wall of said locking sleeve when said locking sleeve is released from engagement with said first mentioned detent and moved to a position on said second connecting member over said second mentioned detent.

20. In the locking mechanism of claim 17 wherein a second spring biased detent is mounted in said second connecting member abutting against the inner wall of said locking sleeve when said locking sleeve is moved to a position on said second connecting member over said second detent.

21. In the locking mechanism of claim 20 wherein said second detent has a tapered upper wall with an apex abutting against said inner wall of said locking sleeve and tapering inwardly toward the central longitudinal axis of said second connecting member and rearwardly thereof.

22. In the locking mechanism of claim 21 including an annular flange on said second connecting member rearwardly of said second mentioned detent, said release sleeve having a shoulder rearwardly of said cylindrical portion, said last mentioned shoulder abutting against said last mentioned flange.

23. In the locking mechanism of claim 22 wherein said first mentioned detent is biased by a spring loaded plunger having a head portion extending in a direction away from said outer release sleeve of a first outer diameter integral with a main body portion of a second outer diameter greater than the first diameter with a tapered area interconnecting said head portion to said plunger main body portion, the longitudinal axis of said plunger being generally coincident with the longitudinal axis of said second connecting member, said first mentioned detent engaging the main body portion of said plunger.

24. In the locking mechanism of claim 23 wherein the outer diameter of said head portion is slightly less than the inner diameter of said hole in said first connecting member.

25. A locking mechanism comprising:

a first connecting member having a cavity for receiving one end of a second connecting member therein;

a second connecting member having a terminal end receivable in said cavity and generally conforming to the configuration of said cavity, said second connecting member having a locking sleeve slidable thereon normally held in a position away from said terminal end, and first releasable locking sleeve means associated with said second connecting member and said locking sleeve for releasing said locking sleeve and allowing the same to be slid to a position overlying said terminal end thereby retaining said terminal end in said cavity when said terminal end is disposed in said cavity, said first releasable locking sleeve means includes said locking sleeve having an inner and outer wall, a groove in said inner wall, said second connecting member having at least one detent disposed in said groove when said locking sleeve is held in a position away from said terminal end, said first releasable locking sleeve means further including a spring biased plunger movable from a first position normally biasing said detent into said groove to a second position releasing said detent from said groove.

26. In the locking mechanism of claim 25 wherein said first connecting member has a hole therein of an inner diameter slightly less than the outer diameter of said plunger and coaxially aligned with the longitudinal axis of said plunger when said terminal end is disposed in said cavity whereby said plunger enters said hole and is pushed against its spring bias to release said detent.

27. In the locking mechanism of claim 26 wherein the width of said terminal end along the longitudinal axis of said second connecting member is substantially the same as the width of said cavity along the longitudinal axis of said first connecting member.

28. A locking mechanism comprising:

a first connecting member having a cavity for receiving one end of a second connecting member therein;

a second connecting member having a terminal end receivable in said cavity and generally conforming to the configuration of said cavity, said second connecting member having a locking sleeve slidable thereon normally held in a position away from said terminal end, and first releasable locking sleeve means associated with said second connecting member and said locking sleeve for releasing said locking sleeve and allowing the same to be slid to a position overlying said terminal end thereby retaining said terminal end in said cavity when said terminal end is disposed in said cavity;

second locking means associated with said second connecting member and said locking sleeve for positively locking said locking sleeve in said position overlying said terminal end;

a release sleeve mounted on said second connecting member and movable thereon from a position remote from said locking sleeve to a position engaging said second locking means thereby releasing said second locking means from locking engagement with said locking sleeve;

release sleeve retention means associated with said second connecting member and said release sleeve for retaining the same in said remote position, said release sleeve retention means including said release sleeve having an inner and outer wall with a groove in said inner wall receiving therein a spring biased detent mounted in said second connecting member, said locking sleeve having an inner and an outer wall and including an undercut section at the end thereof opposite the end adjacent said terminal end providing a shoulder on the inner wall of said locking sleeve, said second locking sleeve means including a spring biased detent disposed in said second connecting member engaging the inner wall of said locking sleeve when said locking sleeve is in a position remote from said terminal end, said undercut section being disposed over said detent when said locking sleeve is in a position overlying said terminal end with said detent engaging said shoulder.

29. A locking mechanism comprising:

a first elongated connecting member having a cavity at one end with a forward wall portion with a hole therein having its longitudinal axis substantially coincident with the longitudinal axis of said first elongated connecting member;

a second elongated connecting member having a terminal end conforming substantially to said cavity, said second connecting member having a locking sleeve slidably mounted on the exterior thereof, said locking sleeve having annular flanges at the front and rear ends thereof with a main body portion interconnecting the flanges having an inner and outer wall, a groove in said inner wall adjacent said front flange receiving therein a spring biased detent in said second connecting member, an undercut area in said inner wall adjacent said rear flange, and a release sleeve mounted on said second connecting member having a thin-walled generally cylindrical portion received in said undercut area and a main body portion abutting against said rear flange with an inner and outer wall, said inner wall having a diameter conforming generally to the exterior of said second connecting member, said release sleeve being frictionally held in position to the exterior of said second connecting member prior to release thereof;

a second detent having a tapered upper wall with an apex abutting against said inner wall of said locking sleeve and tapering inwardly toward the central longitudinal axis of said second connecting member and rearwardly thereof;

an annular flange on said second connecting member rearwardly of said second mentioned detent, said release sleeve having a shoulder rearwardly of said cylindrical portion, said last mentioned shoulder abutting against said last mentioned flange, said first mentioned detent being biased by a spring loaded plunger having a head portion extending in a direction away from said outer release sleeve of a first outer diameter integral with a main body portion of a second outer diameter greater than the first diameter with a tapered area interconnecting said head portion to said plunger main body portion, the longitudinal axis of said plunger being generally coincident with the longitudinal axis of said second connecting member, said first mentioned detent engaging the main body portion of said plunger.

30. In the locking mechanism of claim 29 wherein the outer diameter of said head portion is slightly less than the inner diameter of said hole in said first connecting member.

31. A locking mechanism comprising:

a first elongated connecting member having a cavity at one end with a forward wall portion with a hole therein having its longitudinal axis substantially coincident with the longitudinal axis of said first elongated connecting member;

a second elongated connecting member having a terminal end conforming substantially to said cavity, said second connecting member having a locking sleeve slidably mounted on the exterior thereof, said locking sleeve having annular flanges at the front and rear ends thereof with a main body portion interconnecting the flanges having an inner and outer wall, a groove in said inner wall adjacent said front flange receiving therein a spring biased detent in said second connecting member, an undercut area in said inner wall adjacent said rear flange, and a release sleeve mounted on said second connecting member having a thin-walled generally cylindrical portion received in said undercut member having a thin-walled generally cylindrical portion received in said undercut area and a main body portion abutting against said rear flange with an inner and outer wall, said inner wall having a diameter conforming generally to the exterior of said second connecting member, said release sleeve being frictionally held in position to the exterior of said second connecting member prior to release thereof, and said release sleeve having a groove in said last mentioned inner wall receiving therein a spring biased detent mounted in said second connecting member rearwardly of said first mentioned detent, and a spring biased detent mounted in said second connecting member abutting against the inner wall of said locking sleeve when said locking sleeve is released from engagement with said first mentioned detent and moved to a position on said second connecting member over said second mentioned detent.

* * * * *